United States Patent
Onozaki

(10) Patent No.: US 11,329,560 B2
(45) Date of Patent: May 10, 2022

(54) VOLTAGE CONVERTER

(71) Applicant: Murata Manufacturing Co., Ltd., Kyoto-fu (JP)

(72) Inventor: Norimichi Onozaki, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 87 days.

(21) Appl. No.: 17/021,916

(22) Filed: Sep. 15, 2020

(65) Prior Publication Data

US 2020/0412248 A1 Dec. 31, 2020

Related U.S. Application Data

(63) Continuation of application No. PCT/JP2019/008526, filed on Mar. 5, 2019.

(30) Foreign Application Priority Data

Mar. 28, 2018 (JP) ............................. JP2018-062176

(51) Int. Cl.
| | | |
|---|---|---|
| *H02M 3/158* | (2006.01) | |
| *H02M 1/08* | (2006.01) | |
| *H02M 1/14* | (2006.01) | |
| *H02M 1/00* | (2006.01) | |

(52) U.S. Cl.
CPC ............. *H02M 3/158* (2013.01); *H02M 1/08* (2013.01); *H02M 1/14* (2013.01); *H02M 1/0048* (2021.05)

(58) Field of Classification Search
None
See application file for complete search history.

(56) References Cited

U.S. PATENT DOCUMENTS

| 10,171,062 | B2 * | 1/2019 | Tani | ........................ | H03H 9/542 |
| 2016/0204755 | A1 * | 7/2016 | Kando | .................... | H03H 9/545 |
| | | | | | 333/175 |
| 2020/0287413 | A1 * | 9/2020 | Peretz | ..................... | H02J 50/05 |

FOREIGN PATENT DOCUMENTS

| CN | 105810547 | * | 7/2016 | .............. | H01J 37/32 |
| EP | 0601858 | * | 6/1994 | .......... | H02M 3/3376 |
| WO | WO-0184698 A1 | * | 11/2001 | .......... | H01L 27/0808 |

* cited by examiner

*Primary Examiner* — Matthew V Nguyen
(74) *Attorney, Agent, or Firm* — Studebaker & Brackett PC

(57) ABSTRACT

A voltage converter with which energy conversion efficiency can be improved during not only low-load conditions but also high-load conditions. A step-down DC-DC converter includes a tapped inductor and a capacitor. The inductor and the capacitor form an LC filter. The inductor and a switching element form a variable inductor having a changeable inductance value. The capacitor and a variable DC voltage source form a variable capacitor having a changeable capacitance value. A control unit changes the inductance value of the variable inductor in accordance with an input/output voltage ratio Vin/Vout between a DC input voltage and a DC output voltage. The control unit changes the capacitance value of the variable capacitor to a capacitance value with which an LC resonant frequency is maintained constant when changing the inductance value of the variable inductor.

20 Claims, 4 Drawing Sheets

VOLTAGE CONVERTER

This application claims benefit of priority to International Patent Application No. PCT/JP2019/008526, filed Mar. 5, 2019, and to Japanese Patent Application No. 2018-062176, filed Mar. 28, 2018, the entire contents of each are incorporated herein by reference.

BACKGROUND

Technical Field

The present disclosure relates to a voltage converter for storing current energy in an inductor and performing voltage conversion between an input voltage and an output voltage.

Background Art

Examples of this type of voltage converter in the related art include a DC-DC power converter disclosed in Japanese Unexamined Patent Application Publication No. 2012-16075.

This DC-DC power converter includes smoothing capacitors C0 and C2 for smoothing input/output direct-current (DC) voltages V0 and V2, a smoothing capacitor C1 functioning as an energy migration capacitor, a plurality of semiconductor switching elements S1a, S1b, S2a, and S2b, and an inductor L for storing current energy.

The DC-DC power converter causes a control unit to perform switching operations in four types of switching modes to cause the control unit to perform a discontinuous current mode (DCM) operation in which a current flowing through the inductor during a switching operation under low-load conditions becomes 0. By this control, the loss of each element becomes low and energy conversion efficiency during low-load conditions becomes high even if the small-sized inductor L having a small inductance value is used. When the small-sized inductor L is used, a footprint can be reduced.

SUMMARY

However, in the above voltage converter in the related art, there remains the problem of the increase in loss that results from the increase in ripple in a continuous operation during high-load conditions.

Accordingly, the present disclosure provides a voltage converter that stores current energy and performs voltage conversion between an input voltage and an output voltage. The voltage converter includes an inductor formed of a variable inductor, a capacitor formed of a variable capacitor, such that the variable capacitor and the variable inductor form an LC filter having a specific LC resonant frequency, and a control unit configured to change an inductance value of the variable inductor in accordance with an input/output voltage ratio between an input voltage and an output voltage.

With this configuration, the inductance value of the inductor can be changed under the control of the control unit in accordance with the input/output voltage ratio that varies from the low input/output voltage ratio to the high input/output voltage ratio. Accordingly, even when the input/output voltage ratio is high, the inductance value of the inductor can be changed to a large inductance value to reduce a ripple current.

According to the present disclosure, there can be provided a voltage converter with which energy conversion efficiency can be improved during not only low-load conditions but also high-load conditions by reducing a ripple to reduce a loss.

DETAILED DESCRIPTION

Next, a DC-DC converter to which a voltage converter according to an embodiment of the present disclosure is applied will be described.

Figure 1A:
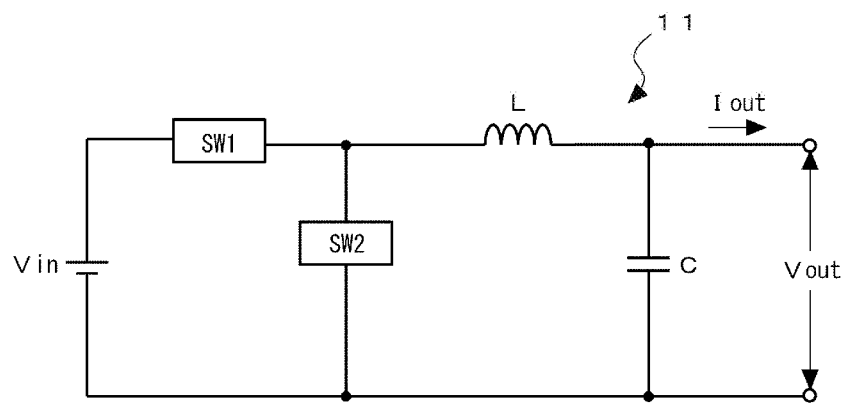
FIG. 1A is a block diagram of a typical step-down DC-DC converter.
Figure 1B:
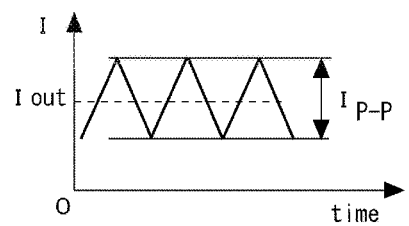
FIG. 1B is a graph representing a ripple current in the step-down DC-DC converter illustrated in FIG. 1A.
Figure 1C:
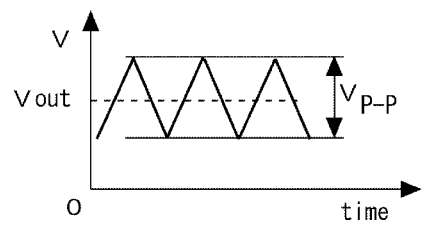
FIG. 1C is a graph representing a ripple voltage.
Figure 2A:
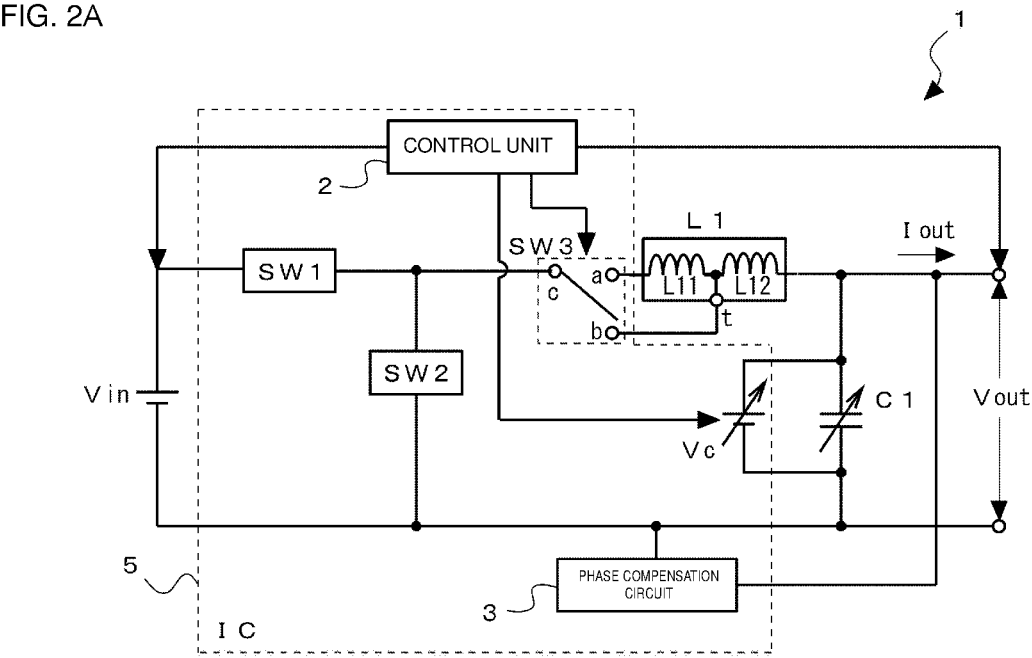
FIG. 2A is a block diagram of a step-down DC-DC converter according to an embodiment of the present disclosure and FIG. 2B is a circuit diagram of a phase compensation circuit illustrated in FIG. 1A.

FIG. 2A is a block diagram illustrating the schematic configuration of a step-down DC-DC converter 1 according to an embodiment of the present disclosure. FIG. 1A is a block diagram illustrating the schematic configuration of a typical step-down DC-DC converter 11 that is a reference. In FIGS. 1A through 2B, the same reference numeral is used to represent the same component or the same part.

As illustrated in FIG. 1A, the typical step-down DC-DC converter 11 that is a reference includes two switching elements SW1 and SW2, an inductor L, and a capacitor C. Each of the switching elements SW1 and SW2 is formed of, for example, a field effect transistor (FET). In the typical step-down DC-DC converter 11, current energy is stored in the inductor L with an output current Iout that flows with a direct-current (DC) input voltage Vin when the switching element SW1 is turned on and the switching element SW2 is turned off. Subsequently, when the switching element SW1 is turned off and the switching element SW2 is turned on, the inductor L generates an electromotive force to maintain the flowing current Iout and flows the output current Iout through the switching element SW2. The inductor L and the capacitor C form an LC filter. The LC filter averages a train of pulses generated by switching of the output current Iout performed by the switching elements SW1 and SW2 and outputs an output voltage Vout (DC voltage). The output voltage Vout is stepped down from the DC input voltage Vin to a necessary voltage on the basis of the set on-duty ratio of the train of pulses. As a result, voltage conversion between the input voltage Vin and the output voltage Vout is performed.

The indices of performance of a DC-DC converter include a ripple current•ripple voltage. FIG. 1B is a graph representing the schematic waveform of a ripple current in the typical step-down DC-DC converter 11. In this graph, the horizontal axis represents time Time and the vertical axis represents current I. A peak-to-peak value $I_{P-P}$ of a ripple current is represented by the following equation (1) using a switching frequency fsw of the switching elements SW1 and SW2 and the inductance value of the inductor L. The peak-to-peak value $I_{P-P}$ of a ripple current in a typical step-up DC-DC converter (not illustrated) is represented by the following equation (2) using similar variables. It is apparent from these equations that the ripple current can be reduced by setting a larger inductance value of the inductor L.

[Expression 1]

$$I_{p-p} = \frac{V_{out}}{f_{SW} \cdot L} \cdot \left(1 - \frac{V_{out}}{V_{in}}\right) \quad (1)$$

$$I_{p-p} = \frac{V_{in}}{f_{SW} \cdot L} \cdot \left(1 - \frac{V_{in}}{V_{out}}\right) \quad (2)$$

FIG. 1C is a graph illustrating the schematic waveform of a ripple voltage in the typical step-down DC-DC converter 11. In this graph, the horizontal axis represents time Time and the vertical axis represents voltage V. A peak-to-peak value $V_{P-P}$ of a ripple voltage is represented by the following equation (3) using the switching frequency fsw of the switching elements SW1 and SW2 and an equivalent series resistance ESR of the capacitor C. The peak-to-peak value $V_{P-P}$ of a ripple voltage in a typical step-up DC-DC converter (not illustrated) is represented by the following equation (4) using similar variables. It is apparent from these equations that the ripple voltage can also be reduced by setting a larger inductance value of the inductor L.

[Expression 2]

$$V_{p-p} = \frac{ESR \cdot V_{out}}{f_{SW} \cdot L} \cdot \left(1 - \frac{V_{out}}{V_{in}}\right) \quad (3)$$

$$V_{p-p} = \frac{ESR \cdot V_{in}}{f_{SW} \cdot L} \cdot \left(1 - \frac{V_{in}}{V_{out}}\right) \quad (4)$$

As illustrated in FIG. 2A, the step-down DC-DC converter 1 according to this embodiment includes a tapped inductor L1 and a capacitor C1 instead of the inductor L and the capacitor C in the typical step-down DC-DC converter 11. The tapped inductor L1 and the capacitor C1 form an LC filter. The tapped inductor L1 includes two inductors L11 and L12 provided with a tap t. A switching element SW3 is connected to the tapped inductor L1. The tapped inductor L1 and the switching element SW3 form a variable inductor having a changeable inductance value.

The switching element SW3 includes a common terminal c and switching terminals a and b. The switching terminal a is connected to the inductor L11. The switching terminal b is connected to the tap t. When the connection of the common terminal c is switched to the switching terminal a in response to a control signal generated by a control unit 2, the inductance value of the tapped inductor L1 becomes L11+L12. When the connection of the common terminal c is switched to the switching terminal b, the inductance value of the tapped inductor L1 becomes L12. The switching element SW3 selects the inductance value of the variable inductor by selecting the tap t of the tapped inductor L1 in response to a control signal from the control unit 2. That is, the inductance value of the variable inductor is changed by the switching of the switching element SW3 performed in response to a control signal from the control unit 2.

The control unit 2 is realized by the software processing of a microprocessor, the hardware of an electronic circuit, or the combination of them. The switching element SW3 is formed of, for example, an FET. Each of switching elements SW4 to SW8 to be described below are similarly formed of, for example, an FET.

A variable DC voltage source Vc is connected in parallel with the capacitor C1. The capacitor C1 and the variable DC voltage source Vc form a variable capacitor. The output voltage of the variable DC voltage source Vc is controlled by the control unit 2. A voltage controlled by the control unit 2 is applied from the variable DC voltage source Vc to the capacitor C1. The capacitance value of the variable capacitor is adjusted by causing the control unit 2 to control a voltage to be applied to the capacitor C1.

Figure 2B:
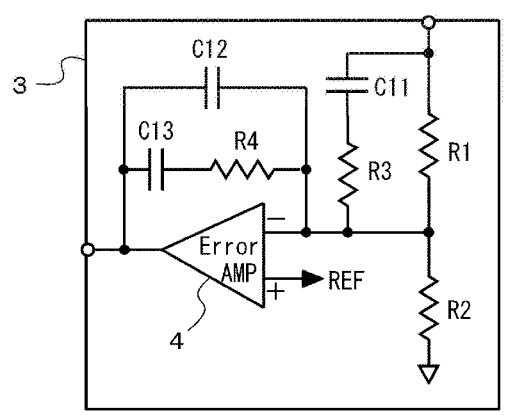

In the DC-DC converter 1, a phase compensation circuit 3 is provided between output terminals. FIG. 2B is a circuit diagram illustrating the configuration of the phase compensation circuit 3. In order to prevent a circuit connected to an output terminal from being broken when the output voltage Vout is brought into an oscillation state in the DC-DC converter 1, the phase compensation circuit 3 is provided to keep the output voltage Vout constant. The phase compensation circuit 3 includes an error amplifier 4, capacitors C11 to C13, and resistors R1 to R4. To suppress a phase lag that is occurred by an LC filter formed of the inductor L1 and the capacitor C1 in a frequency region where the phase lag occurs, a phase lead angle correction circuit for canceling a phase lag, which is formed of CR elements, is provided. The resistors R1 to R4 and the capacitors C11 to C13 near the error amplifier 4 are therefore combined. The values of these respective CR elements are adjusted to optimum values to allow the error amplifier 4 to have predetermined gain-to-frequency characteristics and predetermined phase-to-frequency characteristics. It is known that the determination of the constants of these respective CR elements is performed in accordance with a resonant frequency f0 of the LC filter.

The control unit 2, the phase compensation circuit 3, the variable DC voltage source Vc, and the switching elements SW1, SW2, and SW3, which are surrounded by a dotted line in FIG. 2A, are formed as an integrated circuit (IC) 5.

Like the typical step-down DC-DC converter 11 illustrated in FIG. 1A, the control unit 2 performs switching control upon the switching elements SW1 and SW2 using a known control method to perform DC voltage conversion between the DC input voltage Vin and the DC output voltage Vout. The control unit 2 changes the inductance value of the variable inductor in accordance with an input/output voltage ratio Vin/Vout between the DC input voltage Vin and the DC output voltage Vout. For this purpose, the control unit 2 detects the values of the DC input voltage Vin and the DC output voltage Vout. When changing the inductance value of the variable inductor, the control unit 2 changes the capacitance value of the variable capacitor to a value with which the LC resonant frequency f0 of a circuit formed of the variable inductor and the variable capacitor is maintained constant.

In this embodiment, as represented by the following table 1, the DC-DC converter 1 operates under conditions where the DC input voltage Vin is in the range of 2.2 to 20 [V], the DC output voltage Vout is 2 [V], the output current Iout is 0.5 [A], and the switching frequency fsw of the switching elements SW1 and SW2 is 2 [MHz].

TABLE 1

| INPUT VOLTAGE [V] | | 2.2 to 20 |
|---|---|---|
| OUTPUT VOLTAGE [V] | | 2 |
| OUTPUT CURRENT [A] | | 0.5 |
| SWITCHING FREQUENCY fsw [MHz] | | 2 |
| INDUCTOR L1 [µH] | Vin ≤ 10 [V] | 0.47 |
| | Vin > 10 [V] | 2.2 |
| CAPACITOR C1, C1 [µF] | Vin ≤ 10 [V] | 94 (=47 × 2) |
| | Vin > 10 [V] | 20 (=10 × 2) |
| LC FILTER RESONANT FREQUENCY f0 [MHz] | | 0.0024 |

As represented by the following table 2, the inductor L1 has element constants including the inductance value of 0.47 [µH] of the inductor L12 at the frequency of 2 [MHz], an alternating-current (AC) resistance value Rac of 0.47 [n] of the inductor L12 at the frequency of 2 [MHz], and a DC resistance value Rdc of 0.094 [n] of the inductor L12. The inductor L1 also has element constants including the combined inductance value of 2.2 [µH] of the inductor L11+L12 at the frequency of 2 [MHz], the combined AC resistance value Rac of 2.2 [n] of the inductor L11+L12 at the frequency of 2 [MHz], and the DC resistance value Rdc of 0.44 [n] of the inductor L11+L12.

TABLE 2

| | INDUCTOR L1 [µH] (f = 2 [MHz]) | INDUCTOR Rac [Ω] (f = 2 [MHz]) | INDUCTOR Rdc [Ω] |
|---|---|---|---|
| L12 | 0.47 | 0.47 | 0.094 |
| L11 + L12 | 2.2 | 2.2 | 0.44 |

As described above, the ripple current•ripple voltage (ripple) decreases with the increase in the inductance value of the inductor L1. In the case where the ratio Vin/Vout of the input voltage Vin to the output voltage Vout is high, a ripple can therefore be reduced by increasing the inductance value of the inductor L1. However, in the case of the certain constant output current Iout, the energy conversion efficiency of the DC-DC converter 1 may be deteriorated in, for example, the region of approximately 100 mA to approximately 600 mA in which the AC loss and the DC loss of the inductor L1 are equal. On the other hand, in the case where the input/output voltage ratio Vin/Vout is low, the inductance loss can be reduced when the inductor L1 having a lower inductance value is used on condition that the magnitude of a ripple is in an allowable range. Accordingly, energy conversion efficiency can therefore be improved. It is therefore desired that the inductance value of the inductor L1 be adjustable when the range of the input voltage Vin is wide.

The control unit 2 changes the inductance value of the variable inductor to a small value when the input/output voltage ratio Vin/Vout is lower than a predetermined value and changes the inductance value of the variable inductor to a large value when the input/output voltage ratio Vin/Vout is higher than the predetermined value. In this embodiment, as represented by Table 1, the control unit 2 switches the connection of the common terminal c of the switching element SW3 to the switching terminal b and sets the inductance value of the tapped inductor L1 to 0.47 [µH] when the input/output voltage ratio Vin/Vout is lower than or equal to 5 (Vin/Vout≤5), that is, the DC input voltage Vin is lower than or equal to 10 [V] (Vin≤10). At the same time, the control unit 2 controls the output voltage of the variable DC voltage source Vc to set the combined capacitance value of the capacitor C1 to 94 (=47×2) [g] and set the resonant frequency f0 of the LC filter to 0.024 [MHz].

The control unit 2 switches the connection of the common terminal c of the switching element SW3 to the switching terminal a and sets the inductance value of the tapped inductor L1 to the L11+L12 of 2.2 [µH] when the input/output voltage ratio Vin/Vout exceeds 5 (Vin/Vout>5), that is, the DC input voltage Vin exceeds 10 [V] (Vin>10). At that same time, the control unit 2 controls the output voltage of the variable DC voltage source Vc to set the combined capacitance value of the capacitor C1 to 20 (=10×2) [µF] and maintain the resonant frequency f0 of the LC filter constant at 0.024 [MHz].

In the step-down DC-DC converter 1 according to this embodiment, the control unit 2 can change the inductance value of the inductor L1 in accordance with the input/output voltage ratio Vin/Vout that varies from the low input/output voltage ratio Vin/Vout to the high input/output voltage ratio Vin/Vout. Accordingly, even when the input/output voltage ratio Vin/Vout exceeds 5, the inductance value of the inductor L1 can be changed to the large inductance value of L11+L12 of 2.2 [µH] to reduce a ripple current. Accordingly, in this embodiment, the energy conversion efficiency of the DC-DC converter 1 can be improved even during high-load conditions.

During low-load conditions in which the input/output voltage ratio Vin/Vout is lower than or equal to 5, the loss of the inductor L1 can be reduced and the energy conversion efficiency of the DC-DC converter 1 can be improved by causing the control unit 2 to set the inductance value of the inductor L1 to the small inductance value of L12 of 0.47 [µH]. During high-load conditions in which the input/output voltage ratio Vin/Vout exceeds 5, a ripple current and a ripple voltage can be reduced and the energy conversion efficiency of the DC-DC converter 1 can be improved by causing the control unit 2 to set the inductance value of the variable inductor to the large inductance value of L11+L12 of 2.2 [µH]. Accordingly, the energy conversion efficiency of the step-down DC-DC converter 1 according to this embodiment can be improved during various load conditions that vary widely from low-load conditions to high-load conditions.

Figure 3A:
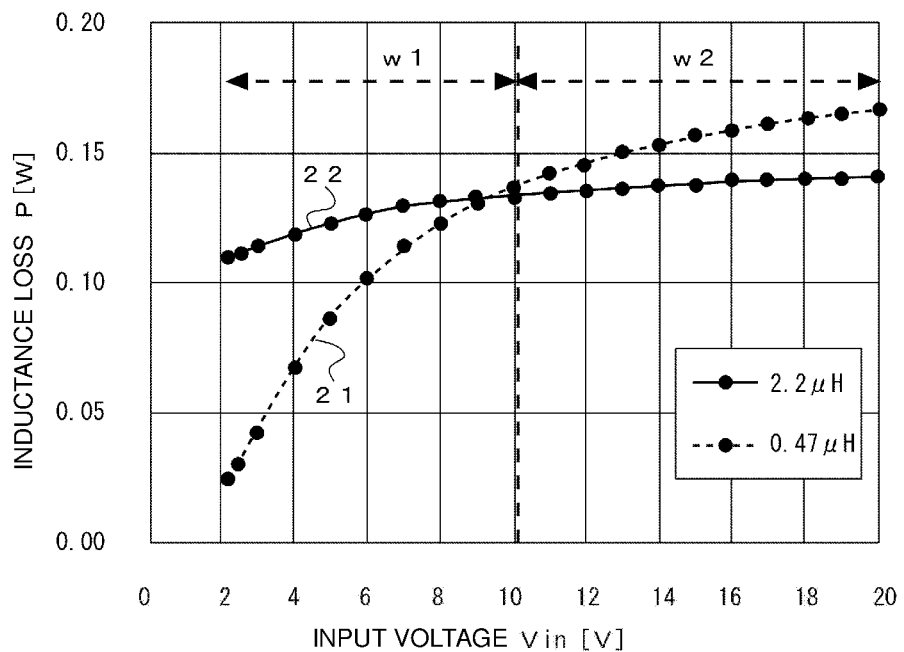
FIG. 3A is a graph representing the change in inductance loss with respect to the change in input voltage in a step-down DC-DC converter according to an embodiment of the present disclosure and FIG. 3B is a graph representing the change in ripple current with respect to the change in input voltage.

FIG. 3A is a graph representing the simulation results of the change in loss (inductance loss) of the inductor L1 with respect to the change in the input voltage Vin in the step-down DC-DC converter 1 according to this embodiment. In the graph, the horizontal axis represents the input voltage Vin [V] and the vertical axis represents an inductance loss P [W]. A characteristic line 21 represented by a dotted line represents a simulation result when the control unit 2 sets the inductance value of the inductor L1 to 0.47 [µH]. A characteristic line 22 represented by a solid line represents a simulation result when the control unit 2 sets the inductance value of the inductor L1 to 2.2 [µH].

Figure 3B:
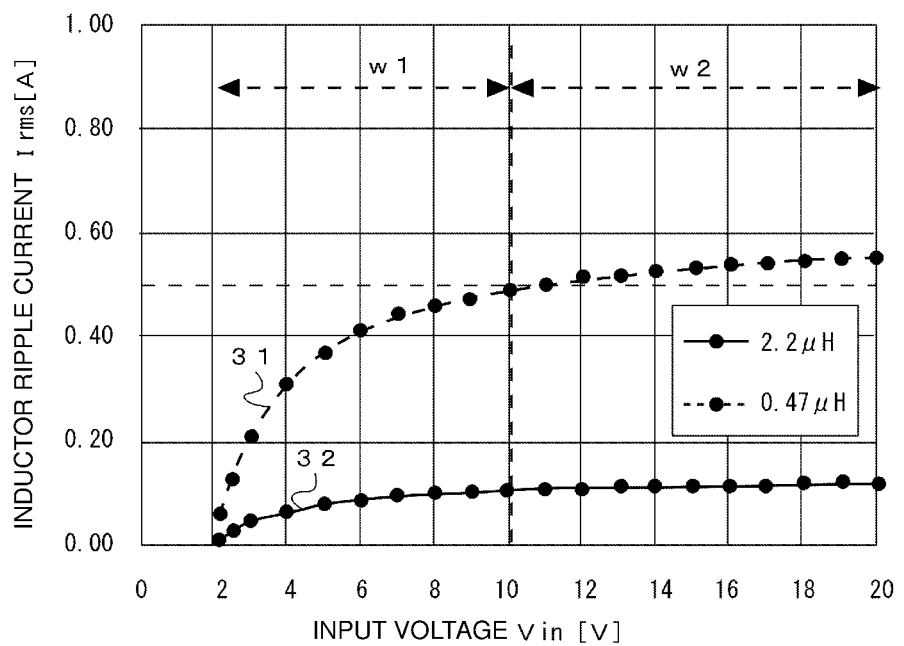

FIG. 3B is a graph representing simulation results of the change in ripple current of the inductor L1 with respect to the change in the input voltage Vin in the step-down DC-DC converter 1 according to this embodiment. In the graph, the horizontal axis represents the input voltage Vin [V] and the vertical axis represents an inductor ripple current Irms [A] using an rms value. A characteristic line 31 represented by a dotted line represents a simulation result when the control unit 2 sets the inductance value of the inductor L1 to 0.47 [µH]. A characteristic line 32 represented by a solid line represents a simulation result when the control unit 2 sets the inductance value of the inductor L1 to 2.2 [µE].

The inductance loss P in the above simulation was calculated using the following equation (5). The inductor ripple current Irms in the above simulation was calculated using the following equation (6). In the equation, Rac represents the AC resistance of the inductor L1, Rdc represents the DC resistance of the inductor L1, and Idc represents the DC component of the current Iout flowing through the inductor L1. In the equation, fsw represents the switching frequency of the switching elements SW1 and SW2 and L represents the inductance value of the inductor L1.

[Expression 3]

$$P = R_{ac} \cdot I_{rms}^2 + R_{dc} \cdot I_{dc}^2 \tag{5}$$

$$I_{rms} = \frac{V_{out}}{2\sqrt{3} f_{sw} L}\left(1 - \frac{V_{out}}{V_{in}}\right) \tag{6}$$

In the graph illustrated in FIG. 3A, in an input voltage range w1 in which the DC input voltage Vin is lower than or equal to 10 (Vin≤10), that is, the input/output voltage ratio Vin/Vout is lower than or equal to 5 (Vin/Vout≤5), the control unit 2 selects the lower inductance loss represented by the characteristic line 21 at the time of setting of the inductance value of 0.47 [pH]. In an input voltage range w2 in which the DC input voltage Vin exceeds 10 [V] (Vin>10), that is, the input/output voltage ratio Vin/Vout exceeds 5 (Vin/Vout >5), the control unit 2 selects the lower inductance loss represented by the characteristic line 22 at the time of setting of the inductance value of 2.2 [μH]. Accordingly, it is understood that regardless of whether the DC input voltage Vin is set to any voltage, the energy conversion efficiency is maintained at a low inductance loss by the switching of an inductance value of the inductor L1 performed by the control unit 2.

In the graph illustrated in FIG. 3B, in the input voltage range w1 in which the DC input voltage Vin is lower than or equal to 10 [v] (Vin≤10), that is, the input/output voltage ratio Vin/Vout is lower than or equal to 5 (Vin/Vout≤5), the control unit 2 selects the inductor ripple current Irms represented by the characteristic line 31 at the time of setting of the inductance value of 0.47 [μH] to set the AC resistance Rac and the DC resistance Rdc of the inductor L1 to small values, so that the inductor ripple current Irms is smaller than or equal to an allowable ripple current value Imax of 0.5 [A]. In the input voltage range w2 in which the DC input voltage Vin exceeds 10 [V] (Vin>10), that is, the input/output voltage ratio Vin/Vout exceeds 5 (Vin/Vout >5), the control unit 2 selects the smaller inductor ripple current Irms represented by the characteristic line 32 at the time of setting of the inductance value of 2.2 [μH], so that the inductor ripple current Irms is smaller than or equal to the allowable ripple current value Imax of 0.5 [A]. Accordingly, regardless of whether the DC input voltage Vin is set to any voltage, the inductor ripple current Irms is suppressed to be smaller than or equal to the allowable ripple current value Imax by the switching of the inductance value of the inductor L1 performed by the control unit 2.

In order to suppress a ripple, for example, a ceramic capacitor with a low equivalent series resistance (ESR) is used as the capacitor C1. However, when the DC-DC converter 1 operates in a voltage control mode, abnormal oscillation may occur at the DC-DC converter 1 because of the low ESR as described above. The phase compensation circuit 3 is therefore provided in the DC-DC converter 1. In the case where the inductance value of the inductor L1 changes, the values of the capacitors C11 to C13 and the resistors R1 to R4 in the phase compensation circuit 3 need to be changed to optimum values because the resonant frequency of the LC filter also changes. In the step-down DC-DC converter 1 according to this embodiment, the inductance value of the inductor L1 can be changed without affecting the characteristics of the phase compensation circuit 3 by changing the capacitance value of the capacitor C1 to the capacitance value with which the LC resonant frequency f0 is maintained constant. That is, the control of the inductance value can be performed in accordance with the input/output voltage ratio Vin/Vout without adjusting the element constants of the capacitors C11 to C13 and the resistors R1 to R4 each time the inductance value changes, and the energy conversion efficiency of the DC-DC converter 1 can be improved while maintaining the optimum phase compensation characteristics.

As described above, when the range of the input voltage Vin is wide, it is desired that the inductance value of the tapped inductor L1 be adjustable. It is considered that the adjustment of an inductance value is performed using a plurality of inductors. However, with the current trend toward downsizing of power supply circuits, an allowable footprint is limited. In the step-down DC-DC converter 1 according to this embodiment, the area of the inductor L1 on the mounting surface of a substrate can be reduced, savings in space can be realized, and the packaging density of circuit elements in the DC-DC converter 1 can be increased because the inductor L1 is formed of a single element as a tapped inductor.

Figure 4A:
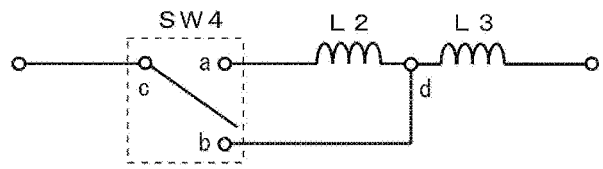
FIGS. 4A to 4D are diagrams illustrating modifications of a variable inductor in a step-down DC-DC converter according to an embodiment of the present disclosure.

In the above embodiment, the case has been described where an inductor for storing current energy is the tapped inductor L1. If there is room for a footprint, a plurality of inductors L2 and L3 may be provided as illustrated in FIG. 4A. In this case, a variable inductor is formed of the inductors L2 and L3 and a switching element SW4 for selecting the number of the inductors (L2 and L3) connected in series. The switching element SW4 has the common terminal c and the switching terminals a and b. The switching terminal a is connected to the inductor L2. The switching terminal b is connected to a node d between the inductors L2 and 13. When the control unit 2 switches the connection of the common terminal c to the switching terminal a, the inductance value of the variable inductor becomes L2+L3. When the control unit 2 switches the connection of the common terminal c to the switching terminal b, the inductance value of the variable inductor becomes L3. That is, in this configuration, the control unit 2 performs the switching of the switching element SW4 to select the number of the inductors (L2 and L3) connected in series, so that the inductance value of the variable inductor is adjusted. The inductor L2 has a noise removal function by itself. Since the inductors L2 and L3 are physically separated from each other, heat dissipation is improved.

Figure 4B:
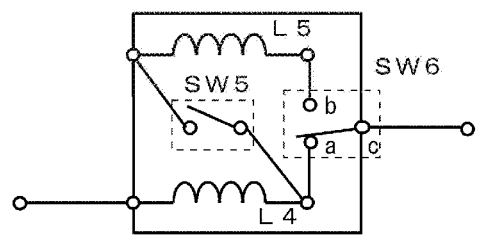
Figure 4C:
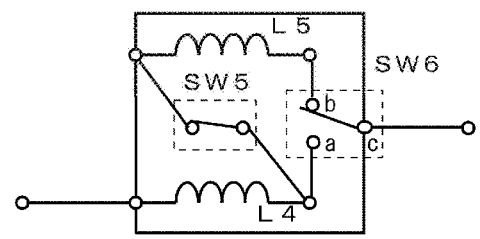

As illustrated in FIGS. 4B and 4C, a plurality of inductors L4 and L5 may be provided. In this case, a variable inductor is formed of the inductors L4 and L5 and switching elements SW5 and SW6 for selecting the number of the inductors (L4 and L5) connected in series. The switching element SW5 is a single-pole single-throw (SPST) switching element and is provided between the inductors L4 and L5. The switching element SW6 has the common terminal c and the switching terminal a and b and is a single-pole double-throw (SPDT) switching element. The switching terminal a is connected to the inductor L4. The switching terminal b is connected to the inductor L5. When the control unit 2 opens the switching element SW5 and switches the connection of the common terminal c of the switching element SW6 to the switching terminal a as illustrated in FIG. 4B, the inductance value of the variable inductor becomes L4. When the control unit 2 turns on the switching element SW5 and switches the connection of the common terminal c of the switching element SW6 to the switching terminal b as illustrated in FIG. 4C, the inductance value of the variable inductor becomes L4+L5. That is, also in this configuration, the control unit 2 performs the switching of the switching elements SW5 and SW6 to select the number of the inductors (L4 and L5) connected in series, so that the inductance value of the variable inductor is changed. The inductors L4 and L5 may be integrated. In this case, as compared with the case where separate components are provided, savings in space can be realized.

Figure 4D:
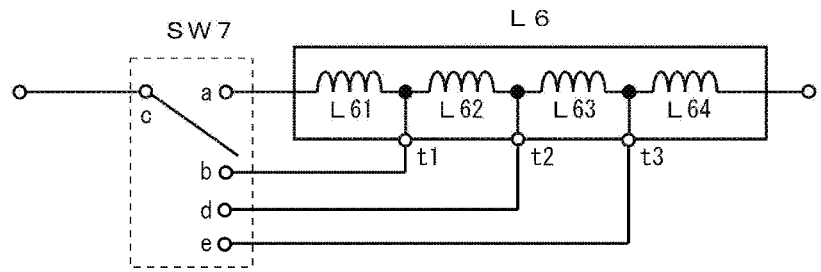

Although the case has been described in the above embodiment and the above respective modifications where the variable inductor has two inductance values, the variable inductor may have three or more inductance values like the case illustrated in FIG. 4D where the variable inductor has four inductance values. The inductor illustrated in FIG. 4D is a tapped inductor L6 including three taps t1, t2, and t3. In this case, a variable inductor is formed of the tapped inductor L6 and a switching element SW7.

The switching element SW7 is a single-pole n-throw (SPnT) (n=4) switching element and has the common terminal c, the switching terminals a and b, and switching terminals d and e. The switching terminal a is connected to an inductor L61. The switching terminals b, d, and e are connected to the taps t1, t2, and t3, respectively. When the control unit 2 switches the connection of the common terminal c to the switching terminal a, the inductance value of the variable inductor becomes L61+L62+L63+L64. When the control unit 2 switches the connection of the common terminal c to the switching terminal b, the inductance value of the variable inductor becomes L62+L63+L64. When the control unit 2 switches the connection of the common terminal c to the switching terminal d, the inductance value of the variable inductor becomes L63+L64. When the control unit 2 switches the connection of the common terminal c to the switching terminal e, the inductance value of the variable inductor becomes L64. The switching element SW7 selects the inductance value of the variable inductor by selecting one of the taps t1, t2, and t3 under the control of the control unit 2. That is, the inductance value of the variable inductor is changed by the switching control of the switching element SW7 performed by the control unit 2.

In this configuration in which the DC input voltage Vin is separated into four segments, the inductance value of a variable inductor can be finely adjusted on a segment-by-segment basis and the ripple current Irms can be reduced to an appropriate value based on the input/output voltage ratio Vin/Vout on a segment-by-segment basis. Accordingly, the energy conversion efficiency of the DC-DC converter 1 can be further improved.

Figure 4E:
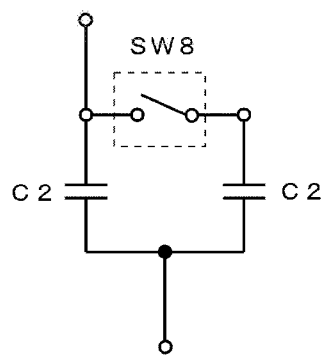
FIG. 4E is a diagram illustrating a modification of a variable capacitor in a step-down DC-DC converter according to an embodiment of the present disclosure.

In the above embodiment, the case has been described where the variable capacitor is formed of the capacitor C1 and the variable DC voltage source Vc and the capacitance value of the capacitor C1 in the LC filter is changed by controlling an voltage to be applied. However, as illustrated in FIG. 4E, a variable capacitor may be formed of a plurality of capacitors C2 and a switching element SW8 for selecting the number of the capacitors C2 connected in parallel. The switching element SW8 is an SPDT switching element. In this configuration, the control unit 2 performs the switching of the switching element SW8 to select the number of the capacitors C2 connected in parallel, so that the capacitance value of the variable capacitor is adjusted. That is, when the control unit 2 opens the switching element SW8 as illustrated in the drawing, the capacitance value of the variable capacitor becomes C2. When the control unit 2 turns on the switching element SW8, the capacitance value of the variable capacitor becomes C2+C2. The capacitor C2 has a noise removal function by itself.

Although the case has been described in the above embodiment and the above respective modifications where the variable capacitor has two capacitance values, the variable capacitor may have three or more capacitance values. In the case where the DC input voltage Vin is separated into three or more segments, the capacitance value of the variable capacitor can be finely adjusted on a segment-by-segment basis, the LC resonant frequency can be accurately maintained constant in accordance with the inductance value of a switched inductor, and the optimum phase compensation characteristics can be appropriately maintained.

Although the case has been described in the above embodiment where a voltage converter according to the present disclosure is applied to a step-down DC-DC converter, a voltage converter according to the present disclosure can be similarly applied to a step-up/down DC-DC converter including an inductor for storing current energy. In the case of a step-up/down DC-DC converter, for example, the DC input voltage Vin can be set to 0.5 to 20 [V] and the DC output voltage Vout can be set to 2 [V]. For example, when the DC input voltage Vin is 1 [V] and the step-up to the DC output voltage Vout of 2 [V] is performed with this configuration, the input/output voltage ratio Vin/Vout becomes 2 that is less than or equal to 5. A control unit performs control processing for reducing the inductance value of a variable inductor like in the above embodiment, so that the AC resistance Rac and the DC resistance Rdc of the inductor are also reduced. Accordingly, an inductance loss can be reduced and the energy conversion efficiency of the step-up/down DC-DC converter can be improved. When the DC input voltage Vin is 20 [V] and the step-down to the DC output voltage Vout of 2 [V] is performed, the input/output voltage ratio Vin/Vout becomes 20 that exceeds 5. A control unit performs control processing for increasing the inductance value of the variable inductor like in the above embodiment, so that the ripple current•ripple voltage can be reduced and the energy conversion efficiency of the step-up/down DC-DC converter can be improved.

A voltage converter according to the present disclosure can be applied to not only the above step-up/down DC-DC converter but also, for example, a step-up DC-DC converter, a single-ended primary-inductor (SPIC) converter, a Cuk converter, and a Zeta converter. Also in the case where a voltage converter according to the present disclosure is applied to these respective converters, a voltage converter can be configured like in the above embodiment which is capable of improving energy conversion efficiency during various load conditions that vary widely from low-load conditions to high-load conditions.

What is claimed is:

1. A voltage converter that stores current energy and performs voltage conversion between an input voltage and an output voltage, comprising:
   an inductor configured as a variable inductor;
   a capacitor configured as a variable capacitor, the variable capacitor and the variable inductor being configured as an LC filter having a specific LC resonant frequency; and a controller configured to change an inductance value of the variable inductor in accordance with an input/output voltage ratio between an input voltage and an output voltage.

2. The voltage converter according to claim 1, wherein the controller is configured to change a capacitance value of the variable capacitor to maintain the specific LC resonant frequency constant when changing an inductance value of the variable inductor.

3. The voltage converter according to claim 2, wherein the variable inductor includes a tapped inductor including a tap and a switching element configured to select the tap in the tapped inductor in accordance with a control signal from the controller to select an inductance value of the variable inductor.

4. The voltage converter according to claim 2, wherein the variable inductor has three or more inductance values.

5. The voltage converter according to claim 2, wherein the variable capacitor includes a plurality of capacitors and a switching element configured to select the number of the capacitors connected in parallel in accordance with a control signal from the controller.

6. The voltage converter according to claim 2, wherein the variable capacitor includes a capacitor and a variable direct-current voltage source configured to change a voltage applied to the capacitor of the variable capacitor in accordance with a control signal from the controller.

7. The voltage converter according to claim 2, wherein the variable capacitor has three or more capacitance values.

8. The voltage converter according to claim 1, wherein the variable inductor includes a plurality of inductors and a switching element configured to select a number of the inductors connected in series in accordance with a control signal from the controller.

9. The voltage converter according to claim 8, wherein the variable inductor has three or more inductance values.

10. The voltage converter according to claim 8, wherein the variable capacitor includes a plurality of capacitors and a switching element configured to select the number of the capacitors connected in parallel in accordance with a control signal from the controller.

11. The voltage converter according to claim 8, wherein the variable capacitor includes a capacitor and a variable direct-current voltage source configured to change a voltage applied to the capacitor of the variable capacitor in accordance with a control signal from the controller.

12. The voltage converter according to claim 8, wherein the variable capacitor has three or more capacitance values.

13. The voltage converter according to claim 1, wherein the variable inductor includes a tapped inductor including a tap and a switching element configured to select the tap in the tapped inductor in accordance with a control signal from the controller to select an inductance value of the variable inductor.

14. The voltage converter according to claim 13, wherein the variable inductor has three or more inductance values.

15. The voltage converter according to claim 13, wherein the variable capacitor includes a plurality of capacitors and a switching element configured to select the number of the capacitors connected in parallel in accordance with a control signal from the controller.

16. The voltage converter according to claim 1, wherein the variable inductor has three or more inductance values.

17. The voltage converter according to claim 1, wherein the variable capacitor includes a plurality of capacitors and a switching element configured to select the number of the capacitors connected in parallel in accordance with a control signal from the controller.

18. The voltage converter according to claim 1, wherein the variable capacitor includes a capacitor and a variable direct-current voltage source configured to change a voltage applied to the capacitor of the variable capacitor in accordance with a control signal from the controller.

19. The voltage converter according to claim 1, wherein the variable capacitor has three or more capacitance values.

20. The voltage converter according to claim 1, wherein the variable inductor includes a plurality of inductors and a switching element configured to select a number of the inductors connected in series in accordance with a control signal from the controller.

* * * * *